United States Patent Office 3,480,120
Patented Nov. 25, 1969

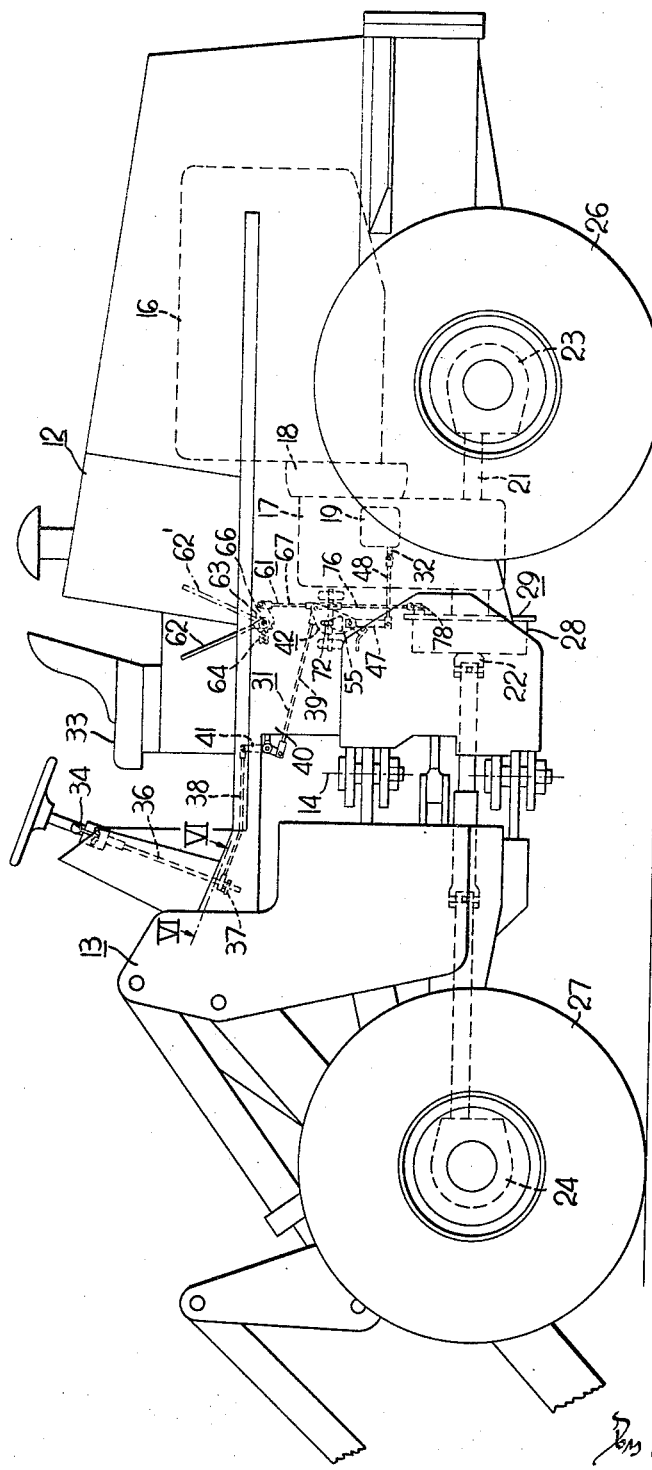

3,480,120
MEANS FOR INTERLOCKING TRANSMISSION
AND PARKING BRAKE CONTROLS
Leo W. Lenzen, Round Lake, Norman G. Olsen, Highland Park, and Raymond N. Wenda, Grayslake, Ill., assignors to Allis-Chalmers Manufacturing Company, Milwaukee, Wis.
Filed Jan. 24, 1968, Ser. No. 700,156
Int. Cl. F16h 57/10; F16d 67/00
U.S. Cl. 192—4                         5 Claims

ABSTRACT OF THE DISCLOSURE

The control linkages for a change speed transmission and a parking brake have interlocking parts which lock the transmission in neutral when the emergency brake is applied. The interlocking parts also coact to shift the transmission control linkage to a neutral position if the parking brake is applied when the transmission is in a drive establishing condition. This interlocking mechanism prevents operation of the vehicle in either forward or reverse when the parking brake is applied thus preventing the parking brake from being "burned up" when inadvertently left engaged during vehicle operation.

---

This invention relates to means for interlocking a change speed transmission control and a parking brake control in such a manner as to prevent the parking brake from being applied when the vehicle is operated in either forward or reverse directions.

It is customary in vehicle design to provide an emergency or parking brake. The parking brake apparatus may operate on the drive shaft or may amount to a secondary means for operating the wheel brakes of the vehicle. When the vehicle is operated in either forward or reverse directions with the emergency brake apparatus accidentally left engaged, the lining of the emergency brake or brakes will overheat and deteriorate. In some instances, the heat could become so intense that the brake lining actually burns. In some types of transmissions, it is possible for the vehicle to be brought to a stop while the transmission is in a drive establishing condition and the parking brake could be applied to hold the vehicle against movement, particularly when the engine is at low idle. This possible condition usually exists in vehicles with transmissions having a fluid coupling or torque converter. Thus the operator in such a vehicle could resume operation by simply increasing engine r.p.m., and it is possible for him to forget that the parking brake was not released. Therefore, there has been a need for provision to prevent the operation of the vehicle when the emergency or parking brake is engaged and also there is a need to return the transmission to neutral position when the emergency brake is applied. The present invention is directed to these desired functions.

It is an object of this invention to provide means for preventing forward or reverse operation of a vehicle when its parking brake is applied.

It is a further object of this invention to provide means for returning the transmission to neutral position when the parking brake is applied should the transmission be in a drive establishing position at the time the parking brake is operated.

It is a further object of this invention to provide interlocking means in the controls for a vehicle transmission and a vehicle parking brake to accomplish the foregoing objects.

It is a more specific object of this invention to provide interlocking parts in the manual control linkages for the transmission and parking brake apparatus of a vehicle which coact to prevent forward or reverse operation of the vehicle when the parking brake apparatus is applied and coact to place the transmission in neutral upon application of the parking brake, assuming the transmission is in a drive establishing condition when the emergency brake is so applied.

These and other objects and advantages of the present invention will be apparent to those familiar with the art when the following description is read in conjunction with the drawings in which:

FIG. 1 is a side view of a vehicle in which the present invention is incorporated;

FIG. 2 is an enlarged side view of the interlocking parts of the transmission and brake control linkages;

FIG. 3 is an end view of the interlocking parts taken along the line III—III in FIG. 2;

FIG. 4 is a partial view of the transmission control linkage showing neutral and drive establishing positions of the transmission control valve;

FIG. 5 is a view of the interlocking parts of the transmission and brake control linkages showing the neutral and drive establishing positions of the interlocking part of the transmission control linkage; and FIG. 6 is a section view taken along the lines VI—VI in FIG. 1.

Referring to FIG. 1, the present invention is incorporated in a four wheel articulated vehicle in the form of a tractor loader which has a rear power unit 12 connected to a front tool unit 13 for articulative steering about a vertical pivot axis 14. The rear power unit 12 includes an engine 16 which is drivingly connected to a change speed transmission 17 through a torque converter 18. The transmission 17 has hydraulic change speed clutches of conventional construction which are operated by a hydraulic control system including a valve 19. The transmission 17 has interconnected output shafts 21, 22 which are connected through drive axles 23, 24 to front and rear drive wheels 26, 27. The output shaft 22 carries a brake drum 28 of parking brake mechanism 29. Since the output shafts 21, 22 and interconnected for rotation with one another, application of the parking brake 29 is effective to stop rotation of all four wheels 26, 27 of the vehicle.

The transmission control means includes a manually operated linkage 31 for reciprocably shifting the hydraulic control valve spool 32 of control valve 19. The transmission control linkage 31 is operated by the operator at his station 33 through a manual shift lever 34 which pivots an upright control rod 36. The pivotal motion of rod 36 is converted to a reciprocating motion by an arm 37 at its lower end as shown in FIG. 6, the end of arm 37 being pivotally connected to a longitudinal rod 38. Rod 38 is connected to a longitudinal rod 39 through a lever 41 pivotally connected at its central portion to the chassis 40 of the rear unit 12.

As shown in FIGS. 1, 2 and 3, the rod 39 is pivotally connected on a transverse axis 45 to an interlocking part in the form of an upstanding plate 55 which is part of a lever assembly 42. The lever assembly 42 includes a rod 46 pivotally connected to chassis 40 by brackets 43, 50 for pivoting about axis 44 and a downwardly extending leg 47, the lower end of which is pivotally connected to one end of a longitudinally disposed rod 48 which has its other end pivotally connected to the transmission control valve spool 32 on a transverse axis 51 as shown in FIG. 4.

The parking brake 29 is operated through a manual control linkage which includes manually operated lever 62 at the operator's station which is pivotally mounted on the chassis 40 of the rear unit 12 for pivotal movement about a transverse axis 63 between its brake applied position shown in solid lines in FIG. 1 and its brake release position shown in dash lines 62' in FIG. 1. A detent mechanism 64 releasably maintains the brake lever 62 in its brake applied position. An arm 66 rigidly secured to brake lever 62 is pivotally connected at its free end to a vertically disposed and reciprocable rod 67. As shown in FIGS. 2 and 3, rod 67 is pivotally connected at its lower end to a lever 68 by a pin 69. Lever 68 is rigidly secured to a rod 71 which is pivotally mounted on chassis 40 for rotation about a longitudinal axis 73. An interlocking part in the form of a rod-like finger 72 is rigidly secured as by welding to rod 71, and as shown in FIGS. 1, 2 and 3, part 72 is in locking relation to part 55 of the transmission control linkage 31.

In FIG. 5 interlocking part 72 of the brake control linkage is shown in a brake release position. The release position is also shown by dash lines 72' in FIG. 3. The free end of lever 68 is pivotally connected to an upstanding rod 76 by a pin 77 and the lower end of rod 76 is pivotally connected to the parking brake operating lever 78. When the rod 76 is shifted upwardly to the position illustrated in FIGS. 1, 2 and 3, the parking brake 29 will be applied.

As shown in FIGS. 1, 2 and 5, the interlocking part 42 of the transmission control means 31 includes a triangular or bell shaped opening 81 defined by two relatively converging abutment surfaces 82, 83. The upper corner or apex of the triangular shaped opening 81 has a neck like slot 84 into which interlocking part 72 will fit as shown in FIG. 2. In this position, the cylindrical outer surface 75 of part 72 serves as abutment surfaces which are in engageable locking relation to the abutment surfaces defining slot 81. In other words, as shown in FIG. 2 the part 72 is disposed in one corner of the triangular opening 81 and in such position will prevent movement of part 42 from its illustrated neutral position.

As shown in FIG. 5, interlocking part 42 may be pivoted about transverse 44 to place the transverse pivot axis 45 in one of the planes R1, R2, F1, F2 which correspond to a first reverse, a second reverse, a first forward and a second forward speed conditions of the transmission.

When the control or interlocking element 42 is in its neutral position, as illustrated in FIG. 5, engagement of the emergency brake 29 through operation of linkage 61 will move interlocking part 72 directly upwardly into the slot 84 of part 42 and the transmission control 31 will be locked in neutral position until the parking brake is released. Thus operation of the vehicle will be prevented when the parking brake is applied. If the transmission control 31 is in one of its drive established positions, R1, R2, F1, F2, and the parking brake 29 is applied, the abutment surface 75 of part 72 will cammingly engage the cooperating abutment surface 82 or 83 and force the transmission control linkage 31 into its neutral position as the part 72 is moved upwardly to its brake applied position as the illustrations in FIGS. 2 and 3. When the interlocking part 72 is in its position as illustrated in FIG. 5, wherein it is disposed in the enlarged base part of the triangular opening 81, the transmission control and its part 42 may be shifted to any drive establishing position, R1, R2, F1, F2, without interference.

The present invention prevents operation of a vehicle in either a forward or a reverse direction when the parking brake is applied. This is achieved by the provision of interlocking parts 42, 72 in the transmission and brake control linkages 31, 61. The parking brake 29 must be released by manual operation of lever 62 before the transmission can be placed in any one of its drive establishing conditions corresponding to the R1, R2, F1, F2 positions of its control linkage 31. It will be understood that when part 42 is pivoted about axis 44, the opening 81 in part 42 will likewise shift therewith. Such shifting movement of part 42 from its neutral position shown in FIG. 5 to drive establishing positions R1, R2, F1, F2, is permitted when the part 72 is in its brake released position as shown in FIG. 5. However, when the parking brake is applied the part 72 will move upwardly into the apex of triangular shaped opening 81 to its locking position shown in FIGS. 1, 2 and 3. If, at the time the parking brake is applied, the transmission is in a drive establishing condition, the abutment surface 75 of part 72 will cammingly engage one of the converging abutment surfaces 82, 83 and shift the transmission and its control means 31 to neutral as part 72 moves into neck-like slot 84 in bell-shaped opening 81. The mechanical interlock prevents the parking brake from being worn out or burned up as has occurred in prior art vehicles when operated with the parking brake applied. This invention also prevents possible fires which could occur when the parking brake overheats due to its being left applied during vehicle operation.

The embodiments of the invention for which an exclusive property or privilege is claimed are defined as follows:

1. In a vehicle having a parking brake apparatus and a change speed transmission shiftable between neutral and forward and reverse drive establishing conditions, the combination comprising:

transmission control means connected to said transmission and including a first interlocking part shiftable between neutral, forward and reverse drive establishing positions to effect said neutral and forward and reverse drive establishing conditions of said transmission, respectively, a brake control means including a second interlocking part shiftable between locking and release positions when said brake apparatus is applied and released, respectively, and abutments on said interlocking parts, respectively, engaging one another to prevent shifting movement of said first part when said second part is in its locking position, said abutments being displaced from one another sufficiently when said brake apparatus is in said release position to permit shifting movement of said first part from neutral to drive establishing positions, said abutments on one of said parts including a pair of camming surfaces permitting said second part to shift said first part from its drive establishing positions to its neutral position when said second part is moved from its release position to its locking position.

2. The invention of claim 1 wherein said abutments on said one part define a triangular shaped opening and wherein the other of said parts is disposed in one corner of said opening when said second part is in its locking position.

3. The invention of claim 2 wherein said opening includes a neck-like slot at said one corner into which said other part fits when said second part is in its locking position.

4. The invention of claim 3 wherein said one part is said first part.

5. The invention of claim 1 wherein said transmission includes an output shaft, said parking brake apparatus is on said output shaft and said control means include manually controlled mechanical linkages in which said interlocking parts are incorporated, respectively.

(References on following page)

References Cited

UNITED STATES PATENTS

| | | | | |
|---|---|---|---|---|
| 766,218 | 8/1904 | Charter. | | |
| 1,919,754 | 7/1933 | Sejersen. | | |
| 2,039,553 | 5/1936 | Roehrl. | | |
| 2,070,266 | 2/1937 | Freeman | 192—4 | XR |
| 2,812,837 | 11/1957 | Khan | 192—4 | XR |
| 2,904,146 | 9/1959 | Codlin | 192—4 | XR |
| 2,970,679 | 2/1961 | Suller et al. | 192—4 | XR |
| 2,990,925 | 7/1961 | Bernotas | 192—4 | XR |
| 3,001,618 | 9/1961 | McCordic et al. | 192—4 | XR |
| 3,033,333 | 5/1962 | Breting et al. | 192—4 | XR |
| 3,373,850 | 3/1968 | Helmer | 192—4 | XR |

MARTIN P. SCHWADRON, Primary Examiner

L. J. PAYNE, Assistant Examiner